Figure 1:
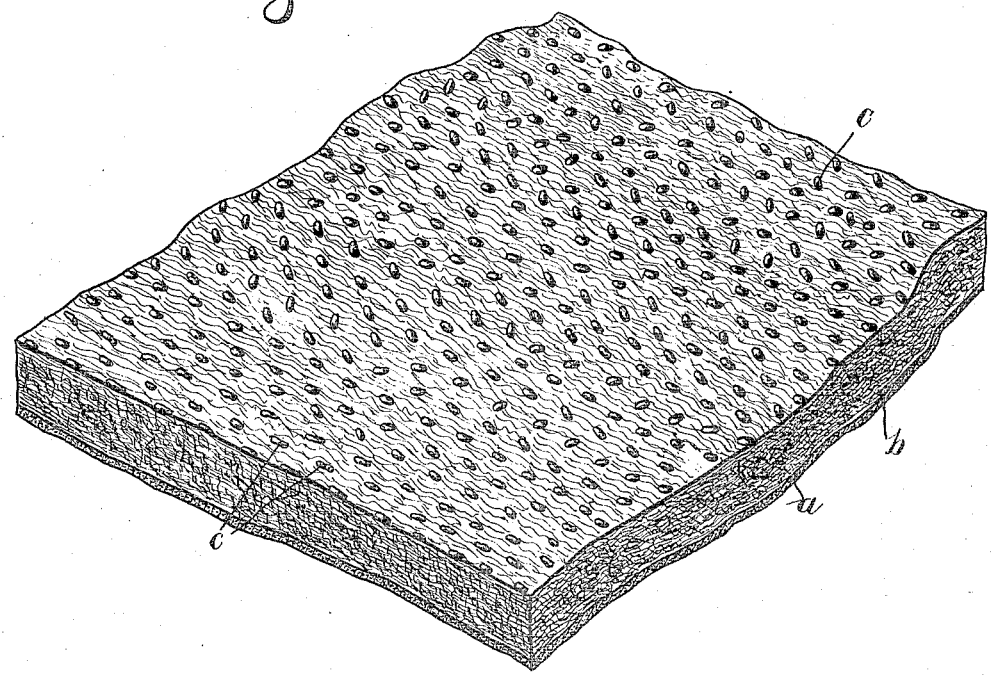

No. 776,246. PATENTED NOV. 29, 1904.
E. A. KANST.
SODDING COMPOSITION AND METHOD OF MAKING SAME.
APPLICATION FILED FEB. 12, 1904.
NO MODEL.

Witnesses:
J B Weir
Emil E. Hettmann

Inventor:
Edwin A. Kanst.
by Bond Adams Pickard Jackson
his Attys.

No. 776,246. Patented November 29, 1904.

UNITED STATES PATENT OFFICE.

EDWIN A. KANST, OF CHICAGO, ILLINOIS.

SODDING COMPOSITION AND METHOD OF MAKING SAME.

SPECIFICATION forming part of Letters Patent No. 776,246, dated November 29, 1904.

Application filed February 12, 1904. Serial No. 193,328. (No specimens.)

*To all whom it may concern:*

Be it known that I, EDWIN A. KANST, a citizen of the United States, residing at Chicago, in the county of Cook and State of Illinois, have invented a new and useful Sodding Composition and Method of Making the Same, of which the following is a specification, reference being had to the accompanying drawings.

My invention relates to the production of sod or analogous growths, and has for its object to provide a new and improved composition capable of being applied to the soil after the manner of sod for securing quickly a thick growth of grass, &c., in the place where the composition is set and which, further, will be of such character that it may be readily manufactured in large quantities and safely handled, stored, and transported.

To this end my invention includes not only the composition, but also the process or method by which it is produced.

My new and improved sodding composition consists of manure with grass-seed sprinkled upon or embedded in it and the whole dried. The finished composition is in the form of a thin sheet from a quarter to a half-inch in thickness, the sheets being of any desired size, so as to be readily susceptible of transportation and storage.

The composition is used by placing it on the ground in the place where the growth of grass is desired. The composition is then thoroughly soaked, causing the grass-seed to sprout, the manure providing the requisite fertilizer, so that in a short time a thick growth of grass is secured.

As a further improvement in the composition I provide on the under side thereof a strengthening-backing of paper or other material, which will not interfere with the downward growth of the grass-roots, but is firm enough to prevent material disintegration of the mat of composition. The backing serves to hold the composition more firmly together and prevent it from crumbling.

I prefer to use cow-manure for the composition; but any other suitable material may be employed.

In making the composition the manure is first ground, preferably in an ordinary sausage-machine, so as to form a homogeneous finely-divided mass. Sufficient water is then added and mixed with the material, so that it flows easily, the mass being thoroughly mixed to a uniform consistency. The resulting fluid mass is then poured upon a fine wire screen, being spread out to a uniform thickness, and is rolled with a wire-screen roller or other suitable device to level it and spread it uniformly over the screen. The seed is then sifted on the surface of the mass, which is then again rolled to embed the seed in the surface of the manure. The mass is then dried, preferably at a temperature of about 130° Fahrenheit. The temperature may, however, be varied considerably, but must not be raised high enough to damage the seed. Where it is desired to use a backing, the backing material is spread upon the screen and the liquid manure poured upon it.

Where soil is to be added, it is mixed with the manure before the latter is ground, the grinding serving also to further mix the materials. The quantity of soil added depends of course upon the richness of the manure, but ordinarily varies from one-fourth to one-sixth by weight.

Figure 2:
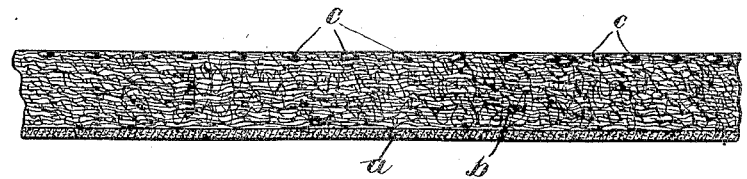

In the accompanying drawings, Figure 1 is a perspective view of a piece of my improved composition, and Fig. 2 is a sectional view thereof.

As illustrated in the drawings, *a* indicates the strengthening-backing, *b* the mass of manure or manure and soil, and *c* the seed.

While my invention is designed primarily for securing a growth of grass, it may also be employed for the planting and germination of other similar seeds. As it may be readily transported and applied to soil, my improved composition, which may be termed "dormant turf," is peculiarly adapted to securing a growth of grass on small plots, such as cemetery-lots and graves, and in all other situations where a large expanse of ground is not present, such as would make it peculiarly advantageous to sow seed in the ordinary manner. Furthermore, the character of the composition is such that it retains moisture for a long time, making it unnecessary to sprinkle the seed frequently while the grass is starting, and besides it imparts a richness to the underlying soil which improves the quality of the grass and secures a permanent turf which is easily cared for and may be readily renewed when worn.

I am aware that it is not new to provide a mat of undried manure with pockets extending therethrough and designed to contain seeds, and therefore do not claim the same. My improved product differs materially, however, from the prior product referred to in many respects. In the first place, in said prior product the manure is not dried. Consequently the seeds are apt to germinate prematurely—as, for example, when the mat is stored—thereby destroying the composition. With my product, however, this danger is avoided, since the manure is dried, and consequently the seeds may be kept as long as desired without danger of germinating. Again, it is impracticable in a commercial sense to form a mat of manure having pockets extending therethrough, since the expense attending its manufacture is prohibitive. Besides, the existence of the pockets weakens the mat and seriously interferes with its firmness and the facility with which it may be handled. This also is not true of my improved product. A further objection to the prior product is that the seeds being placed in pockets extending through the mat must derive their nourishment from the soil beneath the mat rather than from the mat itself. In my product, however, the seeds being embedded in the mat germinate therein and grow independently of the soil below the mat until the rootlets extend beyond the mat into the soil.

That which I claim as my invention, and desire to secure by Letters Patent, is—

1. A sodding composition, consisting of a sheet of dried manure having seed embedded therein, and a strengthening-backing, substantially as described.

2. A composition, consisting of a dried mixture of soil and manure having seed embedded therein, substantially as described.

3. The method of making a sodding composition which consists in adding water to manure, adding seed thereto, and drying the mass in the form of a sheet, substantially as described.

4. The method of making a sodding composition which consists in spreading manure in the form of a sheet, sprinkling seed upon it, and drying the mass, substantially as described.

5. The method of making a sodding composition which consists in mixing soil and manure, spreading the same in the form of a sheet, sprinkling seed thereupon, and drying the mass, substantially as described.

6. The method of making a sodding composition which consists in adding water to manure, spreading the same out in the form of a sheet, sprinkling seed upon the surface thereof, passing a roller over the surface of the mass and drying the same, substantially as described.

7. The method of making a sodding composition, which consists in spreading manure in the form of a sheet upon a suitable strengthening-backing, distributing seed over the mass, and drying the same, substantially as described.

EDWIN A. KANST.

Witnesses:
HELEN M. COLLIN,
ALBERT H. ADAMS.